United States Patent
Mongazon-Cazavet et al.

(10) Patent No.: US 9,973,396 B2
(45) Date of Patent: May 15, 2018

(54) ON-DEMAND QOS FOR DATA CONNECTIONS

(71) Applicant: ALCATEL LUCENT, Boulogne-Billancourt (FR)

(72) Inventors: Bruno Mongazon-Cazavet, Nozay (FR); Jean-Luc Lafragette, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/021,781

(22) PCT Filed: Sep. 26, 2014

(86) PCT No.: PCT/EP2014/070653
§ 371 (c)(1),
(2) Date: Mar. 14, 2016

(87) PCT Pub. No.: WO2015/044371
PCT Pub. Date: Apr. 2, 2015

(65) Prior Publication Data
US 2016/0234081 A1 Aug. 11, 2016

(30) Foreign Application Priority Data
Sep. 30, 2013 (EP) .................................... 13290234

(51) Int. Cl.
*H04L 12/24* (2006.01)
*H04W 60/04* (2009.01)
(Continued)

(52) U.S. Cl.
CPC ...... *H04L 41/5051* (2013.01); *H04L 61/2592* (2013.01); *H04L 61/3075* (2013.01);
(Continued)

(58) Field of Classification Search
CPC . H04L 41/5029; H04L 41/5051; H04L 47/20; H04L 61/3075; H04L 63/102; H04W 28/0268; H04W 28/24
See application file for complete search history.

(56) References Cited

U.S. PATENT DOCUMENTS

2007/0019643 A1  1/2007 Shaheen
2009/0313356 A1  12/2009 Guttman et al.
(Continued)

FOREIGN PATENT DOCUMENTS

EP    2600652 A1   6/2013
GB    2422749 A    8/2006
(Continued)

OTHER PUBLICATIONS

International Search Report PCT/ISA/210 for International Application No. PCT/EP2014/070653 dated Jan. 22, 2015.

*Primary Examiner* — Nam Huynh
(74) *Attorney, Agent, or Firm* — Harness, Dickey & Pierce, P.L.C.

(57) ABSTRACT

A method for providing on-demand quality-of-service for a data connection of a user equipment to a 3GPP data access network, this method comprising a sending step, during the attach procedure of the user equipment to the 3GPP data access network, of a message from the user equipment to the 3GPP data access network, this message including an access point name, this access point name comprising an explicit quality-of-service request being requested by the user equipment for the data connection, this explicit quality-of-service request being formatted in a predefined syntax.

14 Claims, 1 Drawing Sheet

(51) Int. Cl.
   *H04W 28/02*   (2009.01)
   *H04L 29/12*   (2006.01)
   *H04W 8/06*    (2009.01)
   *H04W 28/24*   (2009.01)
   *H04W 60/00*   (2009.01)
   *H04W 76/02*   (2009.01)

(52) U.S. Cl.
   CPC ......... *H04W 8/06* (2013.01); *H04W 28/0268* (2013.01); *H04W 28/24* (2013.01); *H04W 60/00* (2013.01); *H04W 60/04* (2013.01); *H04W 76/02* (2013.01)

(56) References Cited

U.S. PATENT DOCUMENTS

| | | |
|---|---|---|
| 2009/0316656 A1 | 12/2009 | Zhao et al. |
| 2010/0254334 A1 | 10/2010 | Lin et al. |
| 2012/0030331 A1 | 2/2012 | Karampatsis |
| 2012/0069763 A1 | 3/2012 | Zhao et al. |
| 2013/0102343 A1 | 4/2013 | Shaw |
| 2014/0213276 A1* | 7/2014 | Breitbach ......... H04W 28/0268 455/452.2 |
| 2015/0072701 A1* | 3/2015 | Watanabe ........... H04W 76/022 455/453 |

FOREIGN PATENT DOCUMENTS

| | | | |
|---|---|---|---|
| JP | 2008541532 A | 11/2008 | |
| KR | 20110030619 A | 3/2011 | |

* cited by examiner

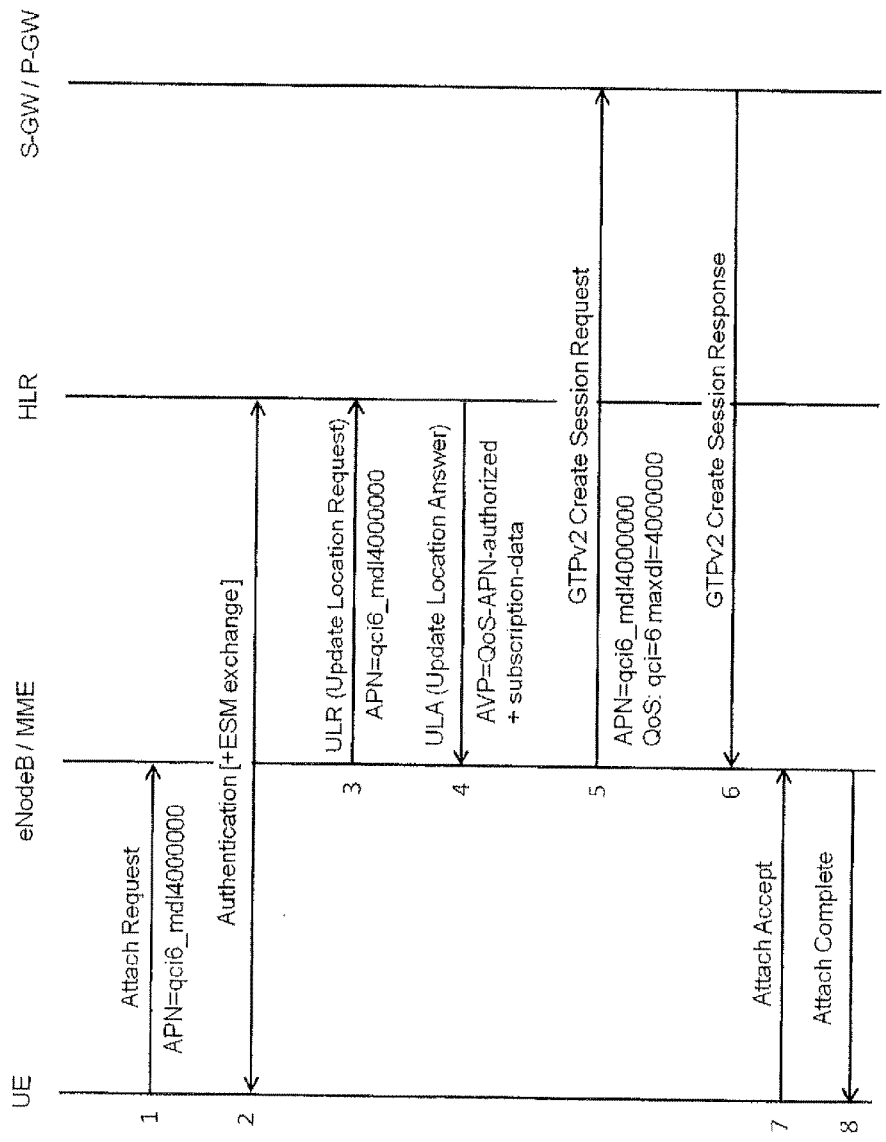

ON-DEMAND QOS FOR DATA CONNECTIONS

CROSS-REFERENCE TO RELATED APPLICATIONS

This application is a national phase under 35 U.S.C. § 371 of PCT International Application No. PCT/EP2014/070653 which has an International filing date of Sep. 26, 2014, which claims priority to European Application No. 13290234.7, filed Sep. 30, 2013, the entire contents of each of which are hereby incorporated by reference.

FIELD OF THE INVENTION

The present invention relates to methods and systems for enabling connections to Access Point Name (APN) in Third Generation Partnership Project (3GPP) data access networks.

BACKGROUND OF THE INVENTION

An Access Point Name (APN) is conventionally a logical name referring to a gateway between a 3GPP mobile data communication network (such as, GPRS, EPC, or LTE (4G)) and another packet data network, generally the Internet.

An APN is further used for referring to a certain data service that a subscriber wishes to connect to. In this regard, 3GPP mobile data network operators provide APN configurations so that various APN values can be used to provide different kind of services to users (e.g. WAP, SMS, MMS, 4G internet service).

Each APN configuration is intended to be used for a certain data bearer service. For instance, an APN configuration may include a particular QoS value needed for VoIP or HD video streaming, while another QoS value needed for MMS.

Therefore, based on appropriate APN configuration by the network operators, basic, intermediate and advanced QoS level per data service may be provided for mobile users. Accordingly, switching from one APN configuration to other moves the data bearer from one QoS level to another or from one type of data plan to another, and eventually causes less or higher charge for the user.

Practically, multiple APN with different QoS are preconfigured by network operators, and then mapped to user's subscriptions (i.e. auto-configured or auto-detected for UEs).

Nevertheless, this approach presents substantial disadvantages, notably because of a lack of flexibility. In fact,
  a subscribed QoS may not be suited for temporary on-demand needs. For example, if a user subscribed with a basic profile wants to enhance its packet rate for a given period (i.e. a week), it has to upgrade its profile on a monthly basis to achieve its temporary needs;
  first subscription may take some time to be operational at operator-level.

Moreover, these preconfigured APN values stand just for names with no explicit QoS semantics. In other words, APN configurations with preconfigured QoS value
  are defined regardless the wishes, in terms of QoS value, of users to get data service on their UEs; and particularly
  do not allow users to ask for explicit QoS values that would differ from subscription's ones at connection time. It results in that users are constrained by long periods to subscription with pre-defined QoS profiles.

SUMMARY OF THE INVENTION

Various embodiments are directed to addressing the effects of one or more of the problems set forth above. The following presents a simplified summary of embodiments in order to provide a basic understanding of some aspects of the various embodiments. This summary is not an exhaustive overview of these various embodiments. It is not intended to identify key of critical elements or to delineate the scope of these various embodiments. Its sole purpose is to present some concepts in a simplified form as a prelude to the more detailed description that is discussed later.

One object of various embodiments is to provide methods and systems for supplying enough flexibility in the QoS selection and subscription by users while data connection.

Another object of various embodiments is to provide methods and systems enabling users of 3GPP data access networks to request on demand QoS for packet access.

Another object of various embodiments is to provide methods and systems to upgrade/downgrade on demand QoS profiles in a simple and compatible manner.

Another object of various embodiments is to provide methods and systems permitting flexible and dynamic subscription mechanisms.

Various embodiments relate to methods for providing on-demand quality-of-service for a data connection of a user equipment to a 3GPP data access network, this method comprising a sending step, during the attach procedure of the user equipment to the 3GPP data access network, of a message from the user equipment to the 3GPP data access network, this message including an access point name, this access point name comprising an explicit quality-of-service request being requested by the user equipment for the data connection, this explicit quality-of-service request being formatted in a predefined syntax.

In accordance with one broad aspect, the explicit quality-of-service request comprises a value corresponding to a quality-of-service Class Indicator and at least a value corresponding to a quality-of-service feature chosen from Max Downlink bit rate, Max Uplink bit rate, Guaranteed Downlink Bit rate, Guaranteed Uplink Bit rate.

In accordance with another broad aspect, the above methods further comprise
  a detection step, by a network entity of the 3GPP data access network, of the predefined syntax comprised in the access point name;
  a checking step for checking whether the use of this syntax is allowed or not for the said user equipment.

In accordance with another broad aspect, the network entity is the Mobility Management Entity of the 3GPP data access network, the Home Location Register of the 3GPP data access network, and/or a packet gateway for carrying the data connection.

In accordance with another broad aspect, the message is the attach request message sent from the user equipment to the Mobility Management Entity of the 3GPP data access network.

In accordance with another broad aspect, the message is sent by the user equipment to the Mobility Management Entity of the 3GPP data access network through Evolved Packet System Session Management information exchange.

In accordance with another broad aspect, the above methods further comprise
- a sending step, in an update location request message, of the explicit quality-of-service request from the Mobility Management Entity of the 3GPP data access network to the Home Location Register of the 3GPP data access network;
- a triggering step, by the Mobility Management Entity of the 3GPP data access network, of the creation of a generic tunneling protocol session with the explicit quality-of-service request being requested by the user equipment for the data connection.

Further, various embodiments relate to a user equipment configured for sending, during an attach procedure to a 3GPP data access network for a data connection, a message including an access point name, this access point name comprising an explicit quality-of-service request being requested by the user equipment for the data connection, this explicit quality-of-service request being formatted in a predefined syntax.

In accordance with a broad aspect, the message is an attach request message sent to the Mobility Management Entity of the 3GPP data access network or a message sent to the Mobility Management Entity of the 3GPP data access network through Evolved Packet System Session Management information exchange.

Further, various embodiments relate to a Mobility Management Entity of a 3GPP data access network configured for detecting an explicit quality-of-service request being requested by a user equipment for a data connection, this explicit quality-of-service request being formatted in a predefined syntax and included in an access point name, said access point name being comprised in a message sent from the user equipment during an attach procedure to the 3GPP data access network.

In accordance with another broad aspect, the above Mobility Management Entity of the preceding claim is further configured for sending an update location request message to the Home Location Register of the 3GPP data access network, this update location request message comprising the explicit quality-of-service request.

In accordance with another broad aspect, the above Mobility Management Entity of the preceding claim is further for triggering the creation of a generic tunneling protocol session with the explicit quality-of-service request.

While the various embodiments are susceptible to various modification and alternative forms, specific embodiments thereof have been shown by way of example in the drawings. It should be understood, however, that the description herein of specific embodiments is not intended to limit the various embodiments to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DESCRIPTION OF THE DRAWING

The objects, advantages and other features of various embodiments will become more apparent from the following disclosure and claims. The following non-restrictive description of preferred embodiments is given for the purpose of exemplification only with reference to the accompanying drawing in which FIG. 1 is a schematic diagram illustrating a procedure for a PDN connection creation according to various embodiments.

DETAILED DESCRIPTION OF ILLUSTRATIVE EMBODIMENTS

With reference to FIG. 1, there is shown a User Equipment (UE) performing an attach procedure in a 3GPP data access network system (such as, GPRS, EPC, or LTE).

As used herein, the term UE is meant broadly and not restrictively to include any device (such as, smartphone, mobile phone, PDA, laptop, tablet) able to establish a PDN connection through a 3GPP data access network system.

In particular, during the attach procedure, the UE is configured to request explicit QoS features for packet access using a specific QoS APN syntax. This specific APN syntax is designed so that this explicit QoS request can carry QoS semantics and details, or more generally explicit information indicative of quality-of-service requested for a data connection. This specific syntax of the explicit QoS request is further designed so that it can be detected and distinguished by network entities from conventional APN format.

By "explicit" is meant that the QoS request is specifically and deliberately formulated as, for example, clearly expressed in QoS features with their respective values.

In various embodiments, the QoS APN syntax may have the following format:
QCI<qci_val>_MDL<max_DL_bitrate>_MUL<max_UL_bitrate>_GDL<guaranteed_DL_bitrate>_GUL<guaranteed_UL_bitrate>
where
- Bold items (namely, QCI for QoS Class Indicator, MDL for max downlink bit rate, MUL for max uplink bit rate, GDL for guaranteed downlink bit rate, and GUL for guaranteed uplink bit rate) are reserved keywords;
- the "_" bold character is used as a predefined separator; and
- italic items are provided as follows:
  - <qci_val>, a mandatory item, refers to a QCI value from 1 to 9 (noticeably, higher values might be considered);
  - <max_DL_bitrate>, a optional item, refers to a Maximum Downlink bit rate (in bits per second);
  - <max_UL_bitrate>, an optional item, refers to a Maximum Uplink bit rate (in bits per second);
  - <guaranteed_DL_bitrate>, an optional item, refers to a Guaranteed Downlink bit rate (in bits per second);
  - <guaranteed_UL_bitrate>, an optional item, refers to a Guaranteed Uplink bit rate (in bits per second).

It is to be noted that the above keywords can be formatted/placed in a different order as long as they are correctly separated by the "_" delimiter, leading to an explicit QoS request formulation.

In variant embodiments, the GDL and/or the GUL items is/are omitted, for example for non-GBR QCI (QCI 5 to 9). If GDL and/or GUL is/are omitted for a GBR QCI, internal default values might be enforced by the MME.

Further, in variant embodiments, the MDL and/or MUL items are omitted. In such a case, the general values provided by the HLR and/or the MME (using local configuration means) might be enforced.

As illustrative example, one can mention the following QoS APN syntax: qci8_mdl5000000 which may be also formatted in the following syntax mdl5000000_qci8 (changing items order).

It is to be further noted that the ARP values cannot currently be set in the QoS APN syntax if the QCI is within the [1, 9] range. In such a case, the ARP is set by the MME according to 3GPP standards. Of course, further extension may allow the usage of QCI values greater than 9 and thus would allow additional syntax elements to support ARP setting.

As illustrative examples of valid CMS APN values, the UE may request
- a QCI 6 with 100 Kbits uplink and 5 Mbits downlink, formatted as follows: QCI6_MUL100000_MDL5000000; or
- a QCI 3 with 200 Kbits uplink (guaranteed 150 Kbits) and 7 Mbits (guaranteed 6 Mbits) downlink, formatted as follows: QCI3_MUL200000_GUL150000_MDL7000000_GDL6000000.

From the network side, the data core network is configured to comprise a specific flag indicative of such QoS APN feature usage authorization. This specific flag may be maintained in the HLR user record, as well as in the MME and the P-GW systems.

Advantageously, thanks to this dedicated flag in the HLR user record, in the MME and in the P-GW systems, the operator can control the usage of such QoS APN feature (allowed or not allowed usage of QoS APN syntax). In other words, at least the HLR, the MME or the P-GW may be configured to detect the QoS APN syntax use, and check if such use is allowed for the requesting UE.

In one embodiment, the network operator may restrict the requested QoS by means of QoS APN syntax at the MME and P-GW level by providing internal controls without further referring to the HLR once the QoS APN feature usage is authorized.

In another embodiment, the HLR and P-GW systems do not attempt to match a detected QoS APN syntax against existing APN configuration if the UE has already subscribed for the QoS APN syntax usage.

In sum, thanks to the use of the predefined specific QoS APN syntax, the UE may request on demand QoS for packet access, while being under the control of a specific subscription type.

FIG. 1 illustrates the call flow of the processing of a PDN connection that uses QoS APN syntax.

In fact, the UE connects to the network (i.e. to the eNodeB and then to the MME) using an Attach Request providing QoS APN value (step 1 in FIG. 1). For instance, this APN value may be formatted as follows APN=qci6_mdl4000000 (namely, a QCI 6 with 4 Mbits downlink).

Subsequently, the MME receives the Attach Request and detects therein the specific QoS APN syntax.

If the MME is not configured to support the QoS APN syntax, it rejects the connection request with the convenient error code (for example, "service not supported"). Otherwise (i.e. if the MME is configured to support the QoS APN syntax), it checks the requested QoS values against local configuration (i.e. Requested QoS profile against available network resources and services, protocols), and thereafter
- sends an Update Location Request (ULR) message to the HLR (step 3 in FIG. 1) providing the QoS APN value (APN=qci6_mdl4000000) if the check succeeds; or
- rejects the connection with convenient error code (i.e. no resource available) if this check fails.

Accordingly, the MME receives the attach request from the UE, detects the presence of a QoS APN syntax, verifies if this UE is authorized to use this service, check if the desired QoS profile (QCI, MDL, MUL, GDL, GUL) can be fulfilled, and therefore enable a location update with the HLR.

Instead of being included in the Attach request, the QoS APN value may be provided, in variant embodiments, to the HLR through ESM information exchange during authentication step (step 2 in FIG. 1). In fact, the QoS APN value may be sent in a response message from the UE to the MME (in response to an information request message from the MME to the UE during the authentication step). This QoS APN may be, then, sent from the MME to the HLR, for example, in an Update Location Request (step 3 in FIG. 1).

Upon reception of ULR from the MME (or, alternatively, through the ESM exchange), the HLR inspects the UE subscription to check if the usage of QoS APN syntax is allowed for this UE. In response to the MME, the HLR returns (step 4 in FIG. 1) a specific AVP in the Update Location Answer (ULA) to carry out the user authorization regarding QoS APN support. The specific AVP is configured to carry a Boolean/Integer value or any other information permitting to indicate if the user is allowed or not to use QoS APN syntax. The ULA may also comprise subscription data that is not APN-specific such as AMBR-DL/UL. Preferably, this specific AVP is standardized among networks operators.

The ULA is received by the MME which in turn checks the specific AVP value returned by the HLR. If the HLR has indicated that the UE is not allowed to use QoS APN, the MME rejects the connection with convenient error code (i.e. service not supported).

If the HLR has indicated that the UE is allowed to use QoS APN, the MME processes the ULA as stated by 3GPP standards. In particular, the MME triggers, at step 5 of FIG. 1, the creation of a GTP session with QoS values derived from the QoS APN value, possibly containing default values locally configured (or contained in ULA) if not present in the QoS APN value. Furthermore, the MME checks that QoS values do not break aggregate bit rates configured for the UE (locally or from ULA). The MME maps the QoS APN values into Bearer Level QoS parameters. This includes: QCI, ARP, MBR-UL, MBR-DL, GBR-UL, GBR-DL.

It is to be noted that, if the QCI value is in the [1, 9] range, the ARP is preferably set according to 3GPP standards.

For establishing the GTP session, the P-GW is configured to support QoS APN syntax. To that end, the P-GW detects the QoS APN syntax and, subsequently allocates an IP address to the UE using the APN value. Preferably, the P-GW is configured to obtain IP addresses from a predefined pool that matches any QoS APN value.

Accordingly, the PGW does not need to match QoS APN values against its own APN configuration so that the GTP session may be established (step 6 in FIG. 1) at P-GW level using the QoS values derived from QoS APN value and carried in "GTPv2 Create Session Request" message. Thus, it results in that the QoS is set up at packet gateway level. In particular, downlink packet rate shaping is installed to match user requirements.

If the P-GW is not configured to support QoS APN syntax, the GTP session creation is be refused with convenient error code (i.e. service not available).

When the GTP session is successfully established, the MME sends an "Attach Accept" message (step 7 in FIG. 1) which is finally acknowledged by the UE with an "Attach complete" message (step 8 in FIG. 1). At that time, the QoS requirements as requested in QoS APN value are set up at eNodeB and P-GW level.

Advantageously, the above described embodiments extend LTE systems to allow controlled usage of QoS APN syntax by operators, providing them with extended subscription and thus revenues capabilities. In fact, different pricings may be proposed for different QoS APN values. Further, these LTE system extensions are, advantageously, backward compatible. The embodiments may be achieved by enhancing control in the HLR, MME and P-GW functions.

Advantageously, these embodiments can be implemented to generate new revenues for such on-demand (dynamic) capabilities.

The above-described embodiments can significantly enhance quality of experience of PDN connections (such as, VoIP, SMS, or Internet connection).

GLOSSARY OF TERMS

AMBR-DL/UL: Aggregate Maximum Bit Rate-Downlink/Uplink
APN: Access Point Name
ARP: Priority, Allocation-retention-preemption-vulnerability and Allocation-retention-preemption-capability
AVP: Attribute-Value Pairs
EPC: Evolved Packet Core
ESM: Evolved packet system Session Management
GBR: Guaranteed Bit Rate
GPRS: General Packet Radio Service
GTP: Generic Tunneling Protocol
HD: High Definition
HLR: Home Location Register
LTE: Long Term Evolution
MME: Mobility Management Entity
MMS: Multimedia Messaging Service
PDN: Packet Data Network
P-GW: Packet Gateway
QCI: QoS Class Indicator
QoS: Quality-of-service
VoIP: Voice over IP
WAP: Wireless Application Protocol

The invention claimed is:

1. A method for providing on-demand quality-of-service for a data connection of a user equipment to a third generation partnership project (3GPP) data access network, the method comprising:
sending, during an attach procedure of the user equipment to the 3GPP data access network, a message from the user equipment to the 3GPP data access network, the message including an access point name, the access point name including an explicit quality-of-service request being requested by the user equipment for the data connection, the explicit quality-of-service request being formatted in a predefined syntax, the explicit quality-of-service request including a value corresponding to a quality-of-service Class Indicator.

2. The method of claim 1, wherein the explicit quality-of-service request further includes a value corresponding to a quality-of-service feature chosen from Max Downlink bit rate, Max Uplink bit rate, Guaranteed Downlink Bit rate, Guaranteed Uplink Bit rate.

3. The method of claim 1, further comprising: detecting, by a network entity of the 3GPP data access network, of the predefined syntax included in the access point name.

4. The method of claim 3, further comprising: checking whether the use of the predefined syntax is allowed or not for the user equipment.

5. The method of claim 3, wherein the network entity is a Mobility Management Entity of the 3GPP data access network, a Home Location Register of the 3GPP data access network, or a packet gateway for carrying the data connection.

6. The method of claim 1, wherein the message is an attach request message sent from the user equipment to a Mobility Management Entity of the 3GPP data access network.

7. The method of claim 1, wherein the message is sent by the user equipment to a Mobility Management Entity of the 3GPP data access network through Evolved Packet System Session Management information exchange.

8. The method of claim 1, further comprising:
sending, in an update location request message, the explicit quality-of-service request from a Mobility Management Entity of the 3GPP data access network to a Home Location Register of the 3GPP data access network.

9. The method of claim 1, further comprising:
triggering, by a Mobility Management Entity of the 3GPP data access network, creation of a generic tunneling protocol session with the explicit quality-of-service request being requested by the user equipment for the data connection.

10. A user equipment configured for sending, during an attach procedure to a third generation partnership project (3GPP) data access network for a data connection, a message including an access point name, the access point name including an explicit quality-of-service request being requested by the user equipment for the data connection, the explicit quality-of-service request being formatted in a predefined syntax, the explicit quality-of-service request including a value corresponding to a quality-of-service Class Indicator.

11. The user equipment of claim 10, wherein the message is an attach request message sent to a Mobility Management Entity of the 3GPP data access network or a message sent to the Mobility Management Entity of the 3GPP data access network through Evolved Packet System Session Management information exchange.

12. A Mobility Management Entity of a third generation partnership project (3GPP) data access network configured for detecting an explicit quality-of-service request being requested by a user equipment for a data connection, the explicit quality-of-service request being formatted in a predefined syntax and included in an access point name, said access point name being comprised in a message sent from the user equipment during an attach procedure to the 3GPP data access network, the explicit quality-of-service request including a value corresponding to a quality-of-service Class Indicator.

13. The Mobility Management Entity of claim 12, further configured for sending an update location request message to a Home Location Register of the 3GPP data access network, the update location request message including the explicit quality-of-service request.

14. The Mobility Management Entity of claim 13, further configured for triggering creation of a generic tunneling protocol session with the explicit quality-of-service request.

* * * * *